United States Patent Office 2,729,586
Patented Jan. 3, 1956

2,729,586

THERAPEUTIC COMPOSITIONS COMPRISING WATER-SOLUBLE CHLOROPHYLL AND SALTS OF FATTY ACIDS

Samuel M. Peck, New York, N. Y., assignor, by mesne assignments, to Rystan Company, Mount Vernon, N. Y., a limited partnership No Drawing. Application February 1, 1952, Serial No. 269,580

13 Claims. (Cl. 167—65)

The invention relates to novel and useful therapeutic compositions, particularly adapted for topical application to infected human tissue, especially in the treatment of dermatomycoses.

The novel compositions of this invention are especially adapted for the treatment of diseases wherever fungicidal, fungistatic or bacteriostatic agents are indicated, and particularly where repair of human tissue is involved. The compositions are applied externally to the human body and may be used, for example, for treating ulcerative lesions, dermatoses, burns and wounds and especially the effects of fungus infections. However, the invention is also adapted for use in intramuscular and intravenous injections.

Objects and advantages of the invention will be set forth in part hereinafter and in part will be obvious herefrom, or may be learned by practice with the invention, the same being realized and attained by means of the compositions of matter, articles of manufacture and combinations pointed out in the appended claims.

The invention consists in the novel compositions, combinations and improvements herein described.

An object of my invention is to provide a novel non-toxic therapeutic composition which is a highly effective astringent, healing and antipruritic composition, and which has a soothing effect upon application.

A further object of my invention is to provide a novel composition which has unusual therapeutic properties for the treatment of damaged human tissue, and in general for the treatment of mycotic infections.

Another object of the invention is to provide a novel therapeutic composition of matter which combines in improved and more effective form the healing, soothing and curative effects of certain known therapeutic agents whereby the individual effects of those agents are enhanced and unexpectedly improved by the combination and conjoint application thereof. The invention combines, in synergistic form and effect, certain bacteriostatic, bacteriocidal, fungicidal, fungistatic and tissue-repairing and cell-stimulating materials which exercise said properties effectively in the combined form and provide a composition which is essentially physiologic in nature and action.

A further object of the invention is to overcome the non-aesthetic qualities and particularly the unpleasant odor of certain healing agents, especially when used in solutions of long-time application, as in wet dressings, while not only retaining but actually enhancing the bacteriostatic, fungicidal and fungistatic actions of such agents.

The invention in general comprises novel therapeutic compositions containing water-soluble chlorophyll and at least one salt of monocarboxylic acid having from three to eleven carbon atoms, including water solutions of such compositions.

Water-soluble derivatives of chlorophyll have been used as a therapeutic agent in the form of aqueous solutions for topical application to wounds and infected areas to control infection and to promote healing by cell stimulation. The action of water-soluble chlorophyll, while not fully understood, is essentially physiologic in effect, being primarily an effect on the host tissue in stimulating cell-granulation and healthy re-growth rather than acting directly on the bacteria per se. It is also known that the so-called lower fatty acids comprising the monocarboxylic acids having from three to eleven carbon atoms and the salts of such acids possess marked fungicidal, fungistatic and bacteriostatic properties, especially for treatment of afflictions of the human skin. Such desirable properties of said acids, hereinafter called the "fatty acids," and of their salts appear to be most marked in those compounds which are most physiologic in their properties, being found in human sweat. Such compounds particularly include alkaline salts of propionic, caprylic and undecylenic acids, which are readily available in a high state of purity.

However, the fatty acids and their salts do not themselves possess any cell-stimulating or tissue-repairing properties. Furthermore, their extensive use has been seriously limited by the objectionable odors characteristic of such materials, which become quite obnoxious to a patient who must be treated for long periods of time with wet dressings, dusting powders and/or ointments of fatty acid salt solutions. Such aesthetically objectionable properties have also inhibited use of such fatty acid compounds in compositions where unpleasant odors are especially objectionable, such as cosmetic preparations having curative properties.

On the other hand, water-soluble chlorophyll is not itself very effective against infections caused by fungus growths, such as dermatological ailments caused by such fungi as Trichophyton, Epidermophyton and Monilia. While such fungus infections have always been troublesome, both in being the direct cause of disease manifestations and in acting as allergy sensitizers, with the introduction of the antibiotics into therapeutics, however, the importance of the fungus antigens as causes of allergic reaction has immeasurably increased.

Because of its inability to act as a fungicide or fungistatic agent, chlorophyll has not been particularly useful in the healing of lesions or in tissue repair where fungus infections are substantially involved.

It is further important to note that solutions formed in accordance with the invention are non-toxic and quite innocuous, being bland, pleasant and soothing to apply. This is due to the fact that the fatty acids are essentially physiologic in nature, as indicated above, while water-soluble chlorophyll is notably non-toxic, healing, cell-stimulating and non-irritating, especially in the concentrations herein indicated. The soothing effect of the combination is remarkable, being far greater than that to be expected from the known effects of the individual compounds.

I have discovered that by combining at least one monocarboxylic acid, having from three to eleven carbon atoms, or a water-soluble salt of such acid, in water solution with an effective amount of a water-soluble chlorophyll, the malodor of the fatty acid salt in use is eliminated or markedly diminished as compared to the fatty acid or salt above. More striking, however, is the fact that water-soluble chlorophyll and such fatty acid salt complement each other in that they enhance the curative actions of each other. In other words the synergistic combination of my invention not only provides a composition which lacks disagreeable odor, but also has increased therapeutic properties. This is particularly indicated by the fact that exceedingly dilute concentrations of chlorophyll are found to possess marked curative properties in combination with the fatty acid compounds.

The water-soluble chlorophyll compositions which may be used are primarily those referred to in Gruskin U. S. Patent No. 2,120,667, including especially sodium or potassium copper chlorophyllin, sodium or potassium magnesium chlorophyllin and sodium or potassium iron chlorophyllin. Preferably I use the commercial form of water-soluble chlorophyll which is now available in high purity, being a mixture of sodium and potassium copper chlorophyllin, predominantly the potassium salt.

Among the salts of a monocarboxylic acid of three to eleven carbon atoms which may be used are salts of both straight chain and branched chain acids. The acids may be either saturated or unsaturated and may have a halogen substituent, such as chlorine substituted for one of the hydrogen atoms.

Either the salt (water-soluble) or the acid may be used, alone or intermixed with other salts and/or acids. Illustrative, but not limiting, examples of such acids and salts which have been found effective are propionic acid, sodium propionate, butyric acid, sodium butyrate, isobutyric acid, valeric acid, soduim valerate, iso-valeric acid, methylethyl acetic acid, caproic acid, oenenthic acid, caprylic acid, pelargonic acid, capric acid, undecylenic acid, sodium undecylenate. The potassium and ammonium salts of such acids are useful as well as the more commonly available sodium salts.

As indicated above, exceedingly small concentrations of the water-soluble chlorophyll may be used when combined with at least one salt of a monocarboxylic acid having from three to eleven carbon atoms, the chlorophyll forming a very small proportion of the total weight of the composition. In solutions suitable for wet dressings, the combined weight of the chlorophyll plus the salts is preferably in the range of 2 to 10% of the total weight of the water solution with the proportion of chlorophyll being in the range of 1:1,000 to 1:100,000. Suitable granular mixtures of the solid ingredients, provided in powder form for the making of solutions, contain dry chlorophyll and the dry salt of the fatty acid in the ratio of one part of chlorophyll to four hundred to one hundred thousand parts of the salt by weight. These proportions indicate the exceeding small amounts of chlorophyll required to exert its odor-eliminating and soothing effects in the combination. However, higher concentrations of chlorophyll are increasingly useful in enhancing the therapeutic effect of the product, especially where serious or stubborn infections are involved. A very practical ratio of salt to chlorophyll is 400:1, but for some conditions I would prescribe a ratio as high as 5:1, the high cost of the chlorophyll being a factor of practical limitation.

Solutions of my therapeutic compositions given in the following Examples I–V are usually applied to the infected area in the form of a wet dressing. Any other equivalent method of application may be used if so desired.

In order to illustrate the invention more specifically, the following examples are given below:

Example I 5 grams of sodium propionate and 12.5 milligrams of sodium and potassium copper chlorophyllin, intimately intermixed in the dry state, are dissolved in 100 cc. of water.

Example II

A mixture of 2.5 grams of sodium propionate and 2.5 grams of sodium caprylate, intermixed with 12.5 milligrams of sodium and potassium copper chlorophyllin are dissolved in 100 cc. of water.

Example III 7.5 grams of sodium caprate and 2.5 milligrams of sodium and potassium copper chlorophyllin, intermixed in dry form as a powder, are dissolved in 100 cc. of water.

Example IV 7.5 grams of sodium undecylenate is added to 100 cc. of water and to this solution is added 5 milligrams of sodium and potassium copper chlorophyllin.

Example V 2.5 grams of sodium valerate is added to 100 cc. of water and to this solution is added 1.5 milligrams of sodium and potassium copper chlorophyllin.

The foregoing examples are illustrative of the wide variety of compositions, in both dry and solution form, which can be made in accordance with the invention, but it will be appreciated that many other examples could be given within the general limits heretofore indicated. While sodium copper chlorophyllin is indicated as the preferred form of water-soluble chlorophyll to be used with the invention, it will be understood that the potassium chlorophyllin salts may be used instead, either alone or in intermixture, and that magnesium and iron in the nucleus of the molecule, instead of copper, may be used also.

It will be found that the hydrogen ion concentration of the solutions employing the novel compositions of my invention are preferably in the neighborhood of pH 6, which is most favorable for fungicidal and fungistatic activity of the fatty acid compounds and is above the pH limit (pH 5.0 to 5.5) at which the water-soluble chlorophyllin salts lose their solubility and become substantially ineffective as deodorizing and cell-stimulating agents. With some solutions of the fatty acid salts embodying the invention the pH may go into the mild alkaline range but preferably not above pH 8. Preferably the solutions will be adjusted to a slightly acid pH, and buffered if desired at about such pH, but never at a hydrogen ion concentration sufficiently acid to cause precipitation or insolubility of the chlorophyll.

For treatment of mucous surfaces such as the eye, mouth, vaginal tract, and the like, it is preferable that the solution be a saline physiological or isotonic solution having a pH of about 7.3, that is, the pH of blood and body fluids.

All the examples given, and many others, are preferably used as wet dressings in the solutions described for application to infected parts of the surface of the human body. Such compositions can also be incorporated in suitable carriers to form ointments, salves and the like, provided a substantial quantity of water is incorporated to keep the fatty acid salts and the chlorophyll in solution. "Carbo-wax" (polymers of ethylene oxide) or the like provides a suitable carrier for such purposes. A suitable ointment comprises one part of water-soluble chlorophyll, ten parts of sodium propionate (or a mixture of sodium propionate, sodium caprylate and sodium undecylenate), the balance being water uniformly distributed throughout a suitable carrier of "Carbo-wax," lanolin, or the like. Generally, ointments, cosmetic creams and similar unguent preparations will be made up in this manner and may contain from 5 to 25% of the fatty acid or fatty acid salts and ½ to 1% of chlorophyll.

Solutions of the type described, because of the bland, odorless and non-toxic nature thereof, are also useful for other therapeutic purposes, such as mouth washes, vaginal douches, foot baths and other applications, especially where fungus infections are involved. Solutions of my composition are also useful in alleviating irritations and inflammation such as diaper rash, prickly heat and the like. Solutions of the compositions can also be used as shaving aids, the solution being somewhat slippery to the touch and thus facilitating shaving (the fatty acid soaps technically being soaps), while having a soothing and healing effect on the face, and also having the fungistatic and bacteriostatic properties mentioned. Essentially cosmetic preparations are highly effective because of the therapeutic effects described, while they are rendered esthetically acceptable because of the action of the chlorophyll in overcoming the hitherto obnoxious odors of the fatty acid compounds. Moreover, due to the soap-like nature of the fatty acid salts, they tend to prevent green stain from the chlorophyll where it contacts the skin or clothing.

For the treatment of certain fungus infections, it is desirable to make intravenous or other subcutaneous injections of solutions of compositions embodying the invention. For such purposes it is preferable that the solution contain about 1% of a salt or salts of the fatty acids and a similar percentage of chlorophyll.

While the composition is usually applied in solution, as indicated, it is conveniently made, handled and sold in the dry powdered or granular mixtures described and in such form constitutes a useful article of manufacture.

The invention in its broader aspects is not limited to the specific compositions described but departures may be made therefrom within the scope of the accompanying claims without departing from the principles of the invention and without sacrificing its chief advantages.

What I claim is:

1. A therapeutic composition comprising water-soluble chlorophyll and an agent selected from the group consisting of sodium, potassium and ammonium salts of fatty acids having from three to eleven carbon atoms, and mixtures of said above-defined salts.

2. The therapeutic composition defined in claim 1 in a water solution in which the total weight of the chlorophyll and agent is between about 2% and 10% of the total weight of the solution and the ratio of the weight of chlorophyll to the agent is in the range of 1:1,000 to 1:100,000.

3. A therapeutic composition as defined in claim 1 in which the agent is sodium propionate.

4. A therapeutic composition as defined in claim 1 in which the agent is a mixture of sodium caprylate and sodium propionate.

5. A composition as defined in claim 1 which in water solution will have a pH between about 5.5 and 8.0.

6. A solution as defined in claim 2 having a pH between 5.5 and 8.0.

7. A composition as defined in claim 1 which in water solution will have a pH above 5.0 to 5.5 at which water-soluble chlorphyll becomes insoluble.

8. A composition as defined in claim 1 wherein the salt is sodium caprylate.

9. A composition as defined in claim 1 wherein the salt is sodium undecylenate.

10. A composition as defined in claim 1 wherein the salt is sodium caprate.

11. A therapeutic composition comprising water-soluble chlorophyll and at least one salt selected from the group consisting of sodium, potassium and ammonium salts of fatty acids having from three to eleven carbon atoms.

12. A cosmetic composition comprising a mixture of sodium copper chlorophyllin and potassium copper chlorophyllin and at least one salt selected from the group consisting of sodium, potassium and ammonium salts of fatty acids from three to eleven carbon atoms.

13. A cosmetic composition comprising an unctuous carrier having an aqueous phase and water-soluble chlorophyll and at least one salt selected from the group consisting of sodium, potassium and ammonium salts of fatty acids having from three to eleven carbon atoms dissolved in said aqueous phase.

References Cited in the file of this patent

UNITED STATES PATENTS

| | | |
|---|---|---|
| 2,120,667 | Gruskin | June 14, 1938 |
| 2,217,905 | Hoffman | Oct. 15, 1940 |
| 2,534,787 | Mecca | Dec. 19, 1950 |

FOREIGN PATENTS

| | | |
|---|---|---|
| 625,727 | Great Britain | July 4, 1949 |
| 617,419 | Great Britain | Feb. 9, 1949 |

OTHER REFERENCES

Strickler: J. A. M. A., Sept. 14, 1946, pp. 65 and 66.

J. A. M. A., May 1951, p. 34.

Zeligman, J.: Invest. Dermatol., September 1949, pp. 111 to 113.

Wallace: Arch. Dermat. and Syphilology, February 1944, pp. 128 to 131.

Unlisted Drugs, Aug. 31, 1951, p. 104.